US010104266B2

(12) United States Patent
Kuroishi et al.

(10) Patent No.: US 10,104,266 B2
(45) Date of Patent: Oct. 16, 2018

(54) INFORMATION PROCESSING APPARATUS, IMAGE PROCESSING METHOD, AND NON-TRANSITORY COMPUTER READABLE STORAGE MEDIUM FOR SWITCHING MODE BASED ON DETECTION OF PERSON

(71) Applicant: FUJI XEROX CO., LTD., Tokyo (JP)

(72) Inventors: Kenji Kuroishi, Yokohama (JP); Masafumi Ono, Yokohama (JP); Kazuhiko Narushima, Yokohama (JP); Koichi Azuma, Yokohama (JP); Hidenori Horie, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 5 days.

(21) Appl. No.: 15/249,765

(22) Filed: Aug. 29, 2016

(65) Prior Publication Data
US 2017/0257519 A1  Sep. 7, 2017

(30) Foreign Application Priority Data
Mar. 7, 2016 (JP) ................. 2016-043213

(51) Int. Cl.
H04N 1/333 (2006.01)
H04L 29/08 (2006.01)
(Continued)

(52) U.S. Cl.
CPC ......... *H04N 1/333* (2013.01); *H04L 67/10* (2013.01); *H04N 1/00251* (2013.01);
(Continued)

(58) Field of Classification Search
None
See application file for complete search history.

(56) References Cited

U.S. PATENT DOCUMENTS 6,208,647 B1 * 3/2001 Deng ............... H04L 12/185
370/230
7,057,754 B1   6/2006 Tsuchiya et al.
(Continued)

FOREIGN PATENT DOCUMENTS

JP   2001-180083 A   7/2001
JP   2009-027348 A   2/2009
(Continued)

OTHER PUBLICATIONS

Aug. 8, 2017 Office Action issued in Japanese Patent Application No. 2016-043213.

*Primary Examiner* — Miya J Williams
(74) *Attorney, Agent, or Firm* — Oliff PLC

(57) ABSTRACT

An information processing apparatus includes: a supply controller that controls supply of power according to a first mode and a second mode having lower power consumption than the first mode; an approach detector that detects an approach of a person during the second mode; a switching unit that switches over from the second mode to the first mode in a case where the approach of the person is detected; an authentication unit that performs authentication of the person after switching over to the first mode; a communication unit that performs communication through a communication line by the power supply in the first mode; an acquiring unit that requests acquisition of data corresponding to a result of the authentication of the person through the communication line, and acquires the data corresponding to the request; and an execution unit that executes a process based on the acquired data.

3 Claims, 8 Drawing Sheets

(51) Int. Cl.
  *H04N 1/00* (2006.01)
  *H04N 1/327* (2006.01)
  *H04L 12/911* (2013.01)

(52) U.S. Cl.
  CPC ..... *H04N 1/00896* (2013.01); *H04N 1/32771* (2013.01); *H04L 47/70* (2013.01); *H04N 2201/0094* (2013.01); *H04N 2201/3205* (2013.01)

(56) References Cited

U.S. PATENT DOCUMENTS

| | | | |
|---|---|---|---|
| 7,352,486 B2 | 4/2008 | Tsuchiya et al. | |
| 2002/0144023 A1* | 10/2002 | Kawabuchi | G06F 3/1204 710/5 |
| 2006/0187480 A1 | 8/2006 | Tsuchiya et al. | |
| 2008/0045267 A1* | 2/2008 | Hind | H04L 51/14 455/557 |
| 2010/0007914 A1* | 1/2010 | Watanabe | H04N 1/001 358/1.15 |
| 2011/0238798 A1* | 9/2011 | Seki | G06K 15/4045 709/220 |
| 2013/0059570 A1* | 3/2013 | Hara | H04W 4/001 455/414.1 |
| 2013/0321847 A1* | 12/2013 | Eun | H04N 1/00891 358/1.14 |
| 2014/0092417 A1* | 4/2014 | Kuroishi | H04N 1/00342 358/1.14 |
| 2015/0002871 A1* | 1/2015 | Ono | H04N 1/00896 358/1.13 |
| 2015/0234624 A1* | 8/2015 | Nii | G06F 3/1238 358/1.14 |

FOREIGN PATENT DOCUMENTS

| | | |
|---|---|---|
| JP | 2015-039151 A | 2/2015 |
| JP | 2015-088113 A | 5/2015 |
| JP | 2015-156109 A | 8/2015 |

\* cited by examiner

INFORMATION PROCESSING APPARATUS, IMAGE PROCESSING METHOD, AND NON-TRANSITORY COMPUTER READABLE STORAGE MEDIUM FOR SWITCHING MODE BASED ON DETECTION OF PERSON

CROSS-REFERENCE TO RELATED APPLICATIONS

This application is based on and claims priority under 35 USC 119 from Japanese Patent Application No. 2016-043213 filed on Mar. 7, 2016.

BACKGROUND

Technical Field

The present invention relates to an information processing apparatus, an information processing method, and a non-transitory computer readable storage medium.

SUMMARY

According to an aspect of the invention, there is provided an information processing apparatus including a supply controller that controls supply of power according to a first mode and a second mode having lower power consumption than the first mode; an approach detector that detects an approach of a person during the second mode; a switching unit that switches over from the second mode to the first mode in a case where the approach of the person is detected; an authentication unit that performs authentication of the person after switching over to the first mode; a communication unit that performs communication through a communication line by the power supply in the first mode; an acquiring unit that requests acquisition of data corresponding to a result of the authentication of the person through the communication line, and acquires the data corresponding to the request; and an execution unit that executes a process based on the acquired data.

BRIEF DESCRIPTION OF THE DRAWINGS

Exemplary embodiments of the present invention will be described in detail based on the following figures, wherein.

DETAILED DESCRIPTION

Figure 1:
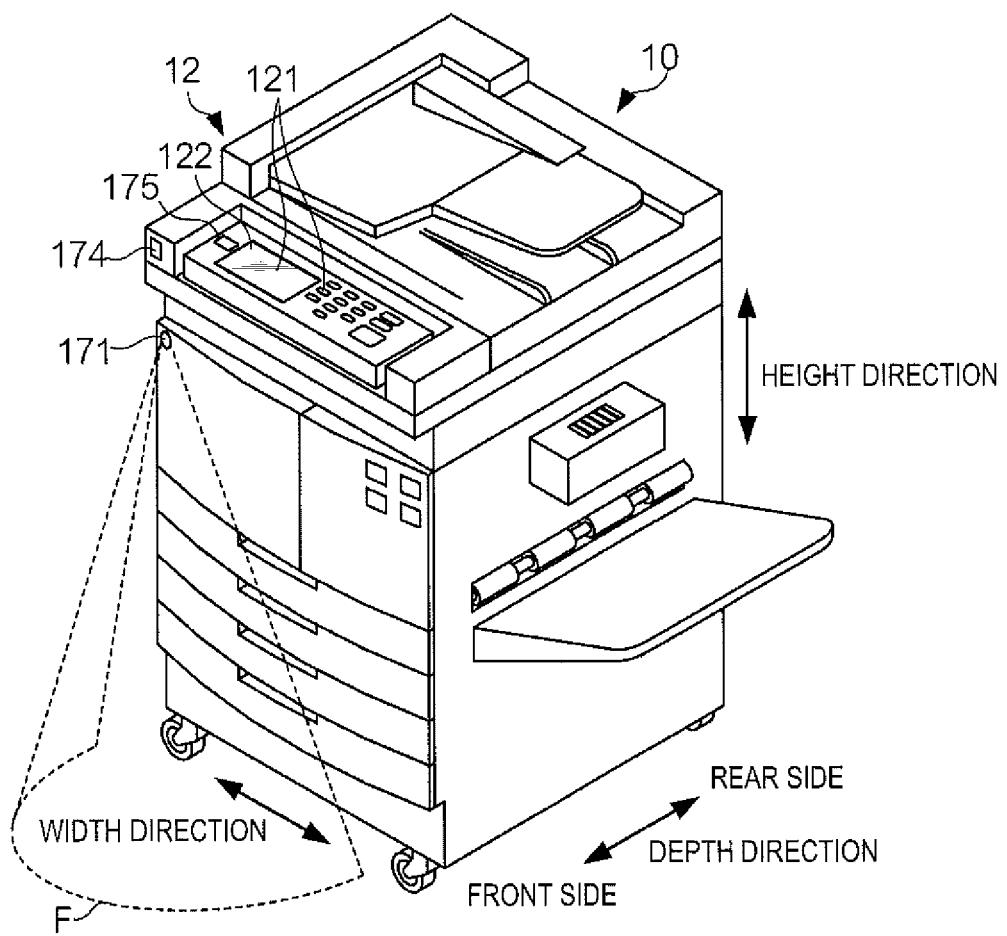
FIG. 1 is a perspective view illustrating an outer configuration of an image forming apparatus according to an exemplary embodiment of the invention.

FIG. 1 is a perspective view illustrating an outer configuration of an image forming apparatus 10 according to an exemplary embodiment of the invention. As illustrated in FIG. 1, the image forming apparatus 10 is a console-type apparatus, and has a function of executing plural processes including a scan process, a copy process and a facsimile transmission process. The image forming apparatus 10 accesses a storage place according to a user so as to acquire image data, and faints an image on a medium such as a sheet based on the image data. That is, the image forming apparatus 10 has a function of performing a so-called pull print, The user stands in front of the image forming apparatus 10, and uses a user interface 12. Specifically, the user operates an operating unit 121 or views an image on a display 122.

The image forming apparatus 10 operates according to either one of two modes which are different in power consumption. The two modes are referred to as a normal mode and a power-saving mode. The normal mode is an example of a "first mode" in which a process is executed according to an operation performed by the user. When the image forming apparatus 10 is operated in the normal mode, power for operation is supplied to hardware circuits of the image forming apparatus 10. The power-saving mode is an example of a "second mode" in which at least a part of the hardware circuits of the image forming apparatus 10 are stopped. When the image forming apparatus 10 is operated in the power-saving mode, power supply to a part of the image forming apparatus 10 is stopped, and the power consumption of the image forming apparatus 10 becomes smaller than in the normal mode.

The image forming apparatus 10 includes a pyroelectric sensor 171 and a first image capturing unit 174 as a configuration for detecting the existence of a person who approaches the image forming apparatus 10 during the power-saving mode. A detection range F illustrated in FIG. 1 is a range where the pyroelectric sensor 171 detects the existence of a user.

Figure 2:
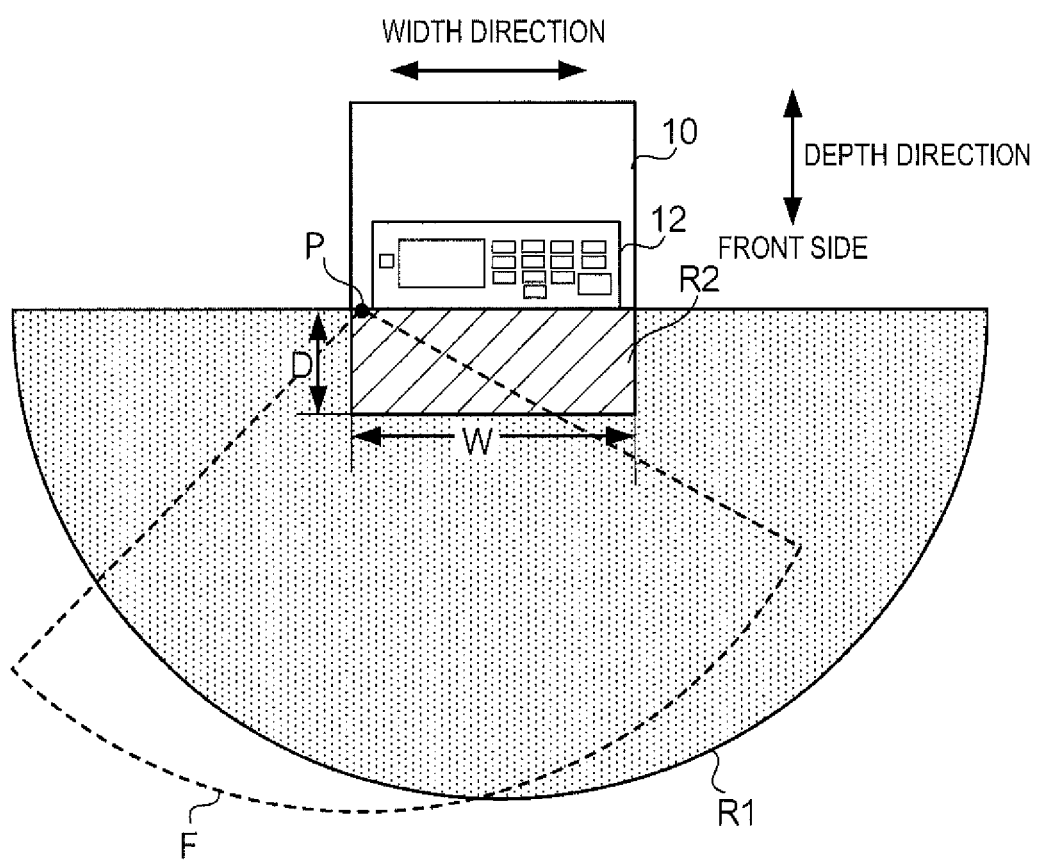
FIG. 2 is a diagram for describing a range in which the existence of a user is detected by the image forming apparatus.

FIG. 2 is a diagram illustrating a range in which the existence of a user is detected by the image forming apparatus 10, FIG. 2 illustrates the image forming apparatus 10 and the surrounding area thereof, when seen from the top in the height direction of the image forming apparatus 10.

As illustrated in FIG. 2, the detection range F of the pyroelectric sensor 171 is formed on the front side of the image forming apparatus 10. For instance, the detection range F is formed in an approximate fan shape when seen from the top in the height direction. A person who intends to use the image forming apparatus 10 first enters the detection range F.

An approach detection range R1 illustrated in FIG. 2 is formed at the front side of the image forming apparatus 10, and has an approximate fan shape when seen from the top in the height direction. The approach detection range R1 is set to include almost the entire part of the detection range F. A person approaching the image forming apparatus 10 enters the approach detection range R1. The approach detection range R1 is an example of a range of a "first distance" from the image forming apparatus 10. In FIG. 2, a position which is represented by symbol "P" and where the first image capturing unit 174 is disposed is set to the position of the image forming apparatus 10.

The approach detection range R1 is formed in a fan shape (semicircle) of which the central angle is 180 degrees, but the central angle may be set to another angle except 180 degrees. The first image capturing unit 174 has an image capturing range set to at least the entire part of the approach detection range R1.

An approach detection range R2 is set on the front side of the image forming apparatus 10, and fainted in a rectangular shape when seen from the top in the height direction. The length of the rectangular range in the width direction of the image forming apparatus 10 is represented by W, and the length of the rectangular range in the depth direction of the image forming apparatus 10 is represented by D. The approach detection range R2 is an example of a range of a "second distance" from the image forming apparatus 10. The approach detection range R2 is a range of distance closer to the image forming apparatus 10 than the approach detection range R1. A user of the image forming apparatus 10 enters the approach detection range R2, stays in the approach detection range R2, and performs an operation using the user interface 12.

Figure 3:
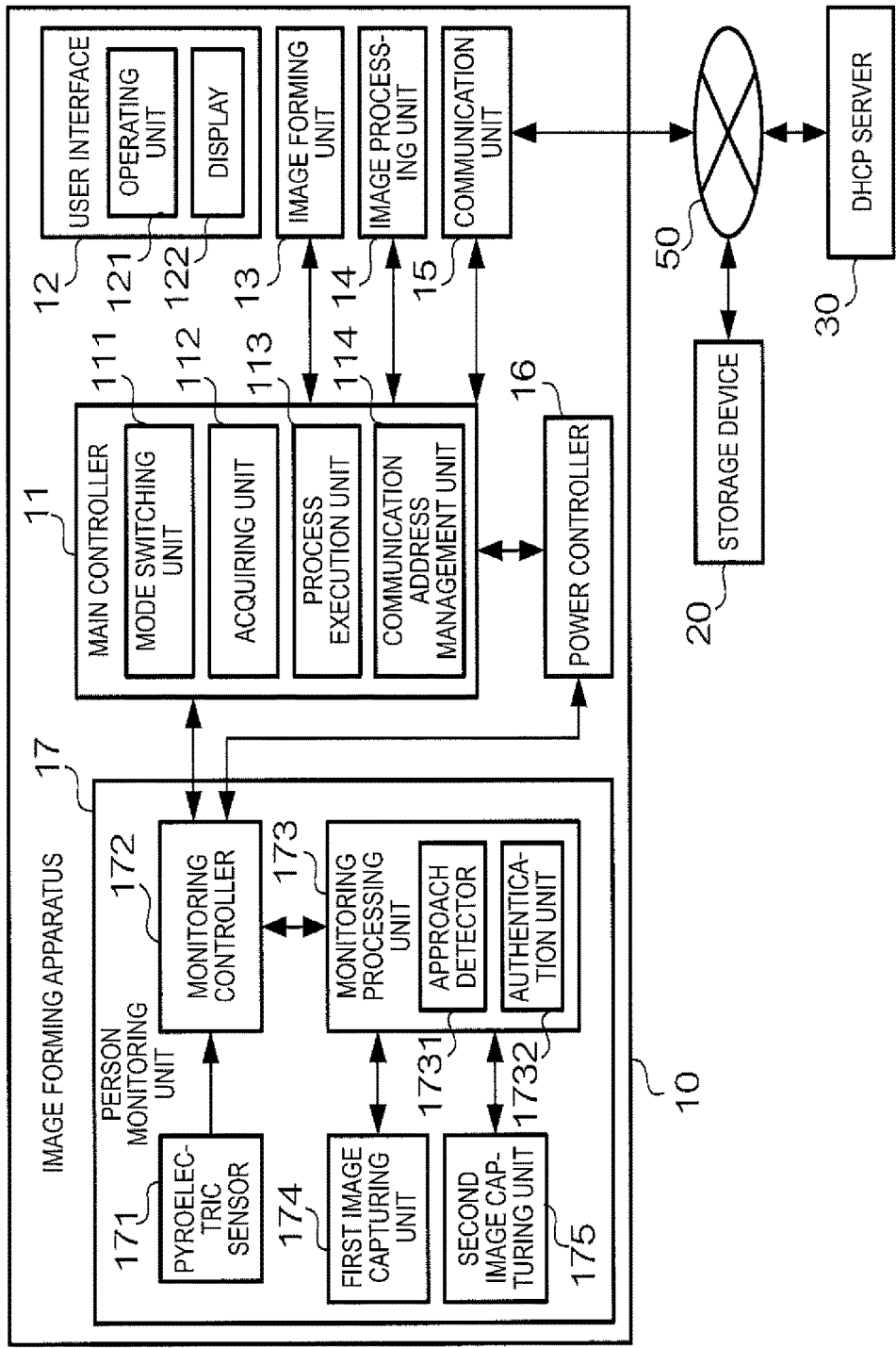
FIG. 3 is a block diagram illustrating a hardware configuration of the image forming apparatus.

FIG. 3 is a block diagram illustrating a hardware configuration of the image forming apparatus 10. As illustrated in FIG. 3, the image forming apparatus 10 includes a main controller 11, the user interface 12, an image forming unit 13, an image processing unit 14, a communication unit 15, a power controller 16, and a person monitoring unit 17.

The main controller 11 includes a processor having a CPU, ROM and RAM. The CPU reads a program stored in the ROM or an auxiliary storage device (not illustrated), for instance, a hard disk device into the RAM, and controls the respective units of the image forming apparatus 10.

The user interface 12 is a unit for realizing interaction with the user, and includes an operating unit 121 that receives an operation input by the user and a display 122 that displays an image. The operating unit 121 has an operator such as a physical key or a touch sensor (for instance, a resistive film-type or electrostatic capacitance-type touch sensor). The operating unit 121 receives a process execution instruction according to the operation of the user (an example of a receiving unit). The display 122 has a liquid crystal panel or liquid crystal driving circuit, for instance. The display 122 displays an image to receive an operation of the user (an example of a display).

The image forming unit 13 is a printer which forms an image on a sheet such as paper through an electrophotographic process, for instance. The image processing unit 14 includes an ASIC (Application Specific Integrated Circuit) to perform various image processes, for instance. The communication unit 15 includes a modem, for example, and performs communication through a communication line 50 (an example of a communication unit). The communication unit 15 communicates with a storage device 20 and a DHCP (Dynamic Host Configuration Protocol) server 30 which are connected to the communication line 50. The communication line 50 may include a wired/wireless line of a public communication line (communication network) such as the Internet.

The storage device 20 is a device that stores image data. The image data are PDL (Page Description Language)-format data, for instance, but may include other formats of data. The storage device 20 may include a PC (Personal Computer) used by an individual, for instance. In this ease, the storage device 20 stores image data which are managed by the individual. The storage device 20 may be a device (for instance, a server apparatus or an image forming apparatus) which stores image data managed by each of plural persons.

The DHCP server 30 has the same configuration as a general DHCP server, and serves to manage communication addresses. For instance, the DHCP server 30 allocates a unique communication address such as IP address to the image forming apparatus 10.

The power controller 16 is electrically connected to a power supply (not illustrated), for instance, a commercial power supply, and controls the supply of power to the respective units of the image forming apparatus 10 from the power supply. The power controller 16 is an example of a supply controller which supplies power to the respective units of the image forming apparatus 10, according to the normal mode and the power-saving mode.

The person monitoring unit 17 monitors a person who exists around the image forming apparatus 10. Specifically, the person monitoring unit 17 includes the pyroelectric sensor 171, a monitoring controller 172, a monitoring processing unit 173, a first image capturing unit 174, and a second image capturing unit 175.

The pyroelectric sensor 171 is a passive infrared human-body detection sensor with a pyroelectric element.

The monitoring controller 172 has a CPU and memory, for instance, and controls the respective units of the person monitoring unit 17. The monitoring controller 172 transmits/receives a signal to/from the main controller 11, or controls the supply of power by the power controller 16.

The monitoring processing unit 173 includes an FPGA (Field-Programmable Gate Array) or ASIC, for instance, and performs a process of monitoring a person who exists around the image forming apparatus 10, using the first and second image capturing units 174 and 175. Each of the first and second image capturing units 174 and 175 has an image capturing element exemplified by an image capturing lens and CCD (Charge Coupled Device), and generates a captured image, for instance, moving image. In particular, the first image capturing unit 174 has a wide-angle lens, for instance, fish-eye lens as the image capturing lens, and captures the front side of the image forming apparatus 10 at a wider view angle than a normal image capturing lens. The second image capturing unit 175 is disposed at a predetermined position, in order to perform face authentication for authenticating the face of a person using a captured image.

Specifically, the monitoring processing unit 173 realizes functions corresponding to an approach detector 1731 and an authentication unit 1732.

The approach detector 1731 is an example of an approach detector which performs an approach detection process for detecting an approach of a person to the image forming apparatus 10. The approach detection process is performed as follow: the approach detector 1731 acquires a captured image from the first image capturing unit 174, the captured image being obtained by capturing the approach detection range R1, and detects a person who exists in the approach detection range R1 or R2, based on the acquired captured image. The approach detector 1731 analyses the captured image and detects a distance to the person from the image forming apparatus 10 or a motion of the person (for instance, a motion vector), thereby detecting an approach of the person to the image forming apparatus 10.

The authentication unit 1732 is an example of an authentication unit which performs authentication of a person. The authentication unit 1732 performs face authentication for authenticating the face of a person who exists in the approach detection range R2, based on the captured image acquired from the second image capturing unit 175. For the face authentication, a publicly known algorithm may be applied. The authentication unit 1732 recognizes the person specified through the face authentication as a user, and transmits a user ID for identifying the user to the main controller 11.

Next, the functional configuration of the main controller 11 will be described. The main controller 11 executes a program to realize functions corresponding to a mode switching unit 111, an acquiring unit 112, a process execution unit 113 and a communication address management unit 114.

The mode switching unit 111 is an example of a switching unit which switches the mode of the image forming apparatus 10. When the mode is switched, the mode switching unit 111 instructs the power controller 16 to supply power in the corresponding mode, and performs control for stopping the start-ups or operations of the respective units of the image forming apparatus 10.

The acquiring unit 112 is an example of an acquiring unit which requests acquisition of image data from the storage device 20 through the communication line 50, the image data corresponding to the authentication result of the monitoring processing unit 173 (authentication unit 1723), and acquires the image data corresponding to the request. That is, the acquiring unit 112 acquires image data which are used in pull print.

The process execution unit 113 is an example of an execution unit that causes the image forming unit 13 to form an image corresponding to the image data acquired by the acquiring unit 112.

The communication address management unit 114 is an example of a communication address management unit which manages a communication address allocated by the DHCP server 30. A communication address according to the present exemplary embodiment is a communication address with a expiration time. That is, when the expiration time expires after the communication address management unit 114 acquired the communication address allocated to the image forming apparatus 10, the communication address management unit 114 returns the corresponding communication address to the DHCP server 30. The communication address management unit 114 may acquire a new communication address allocated from the DHCP server 30, after returning the communication address.

Next, the operation of the present exemplary embodiment will be described.

<A: Process Related to Pull Print>

Figure 4:
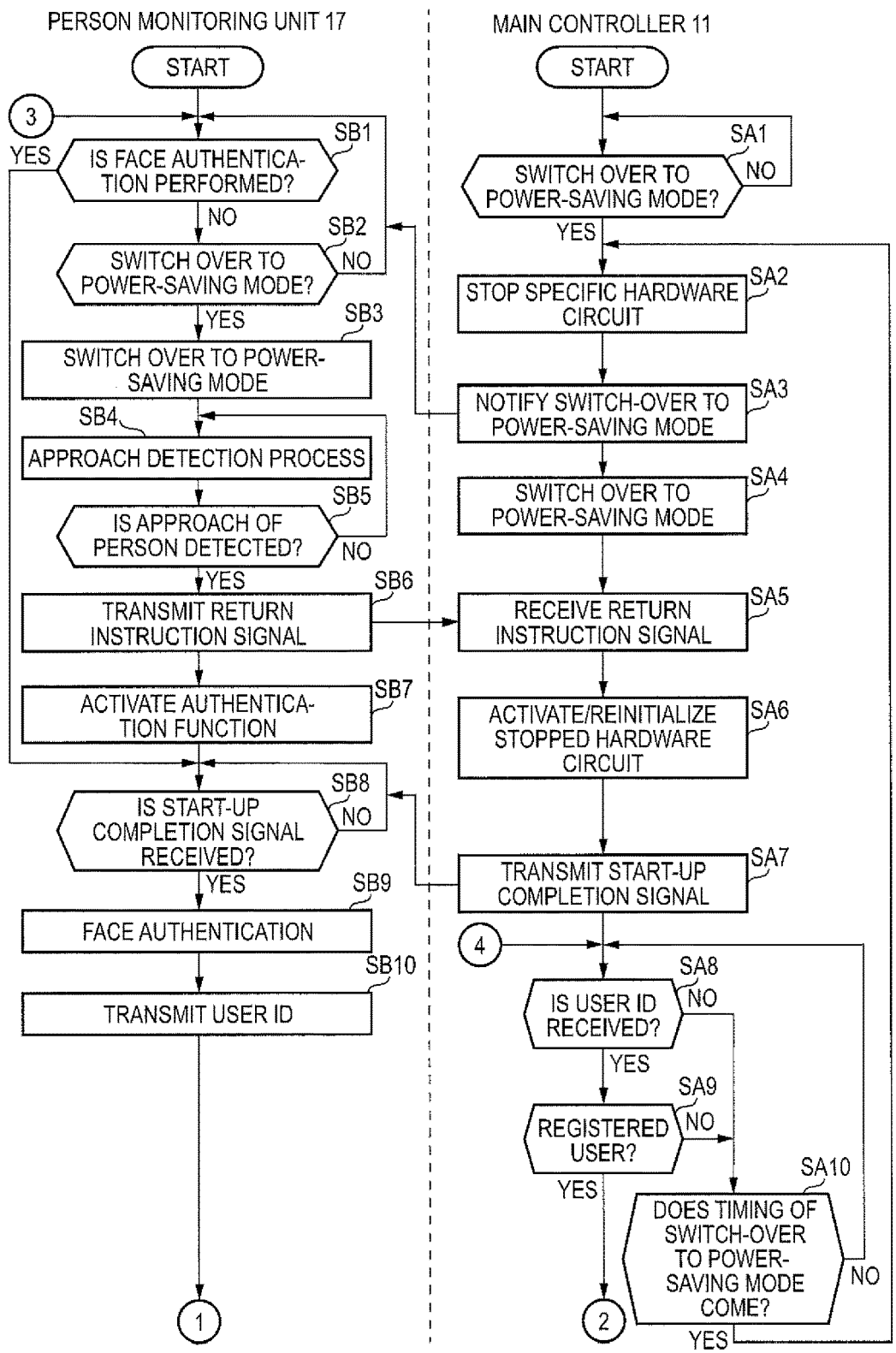
FIG. 4 is a flowchart illustrating a process related to a pull print executed by the image forming apparatus.
Figure 5:
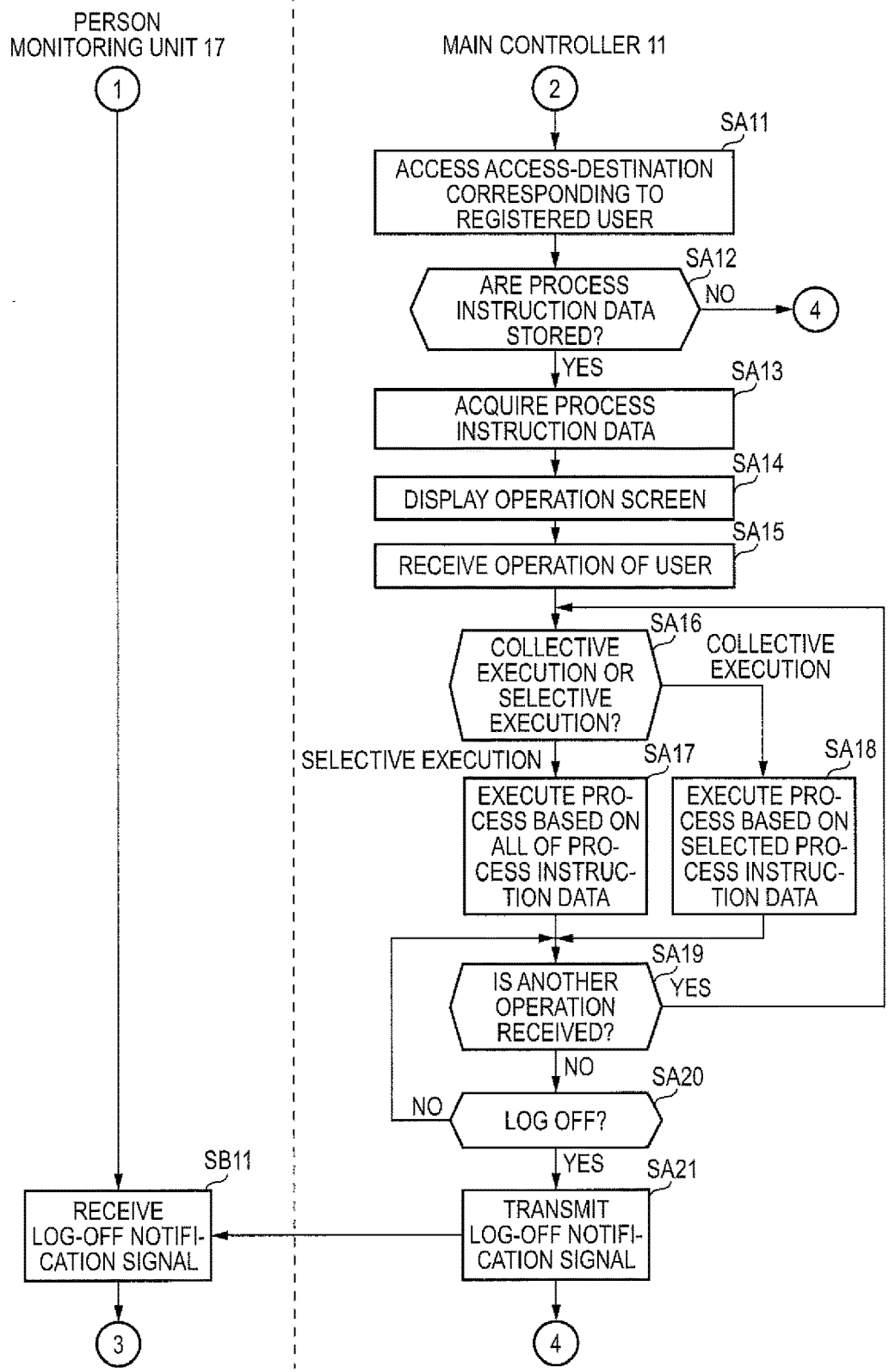
FIG. 5 is a flowchart illustrating a process following FIG. 4.
Figure 6A:
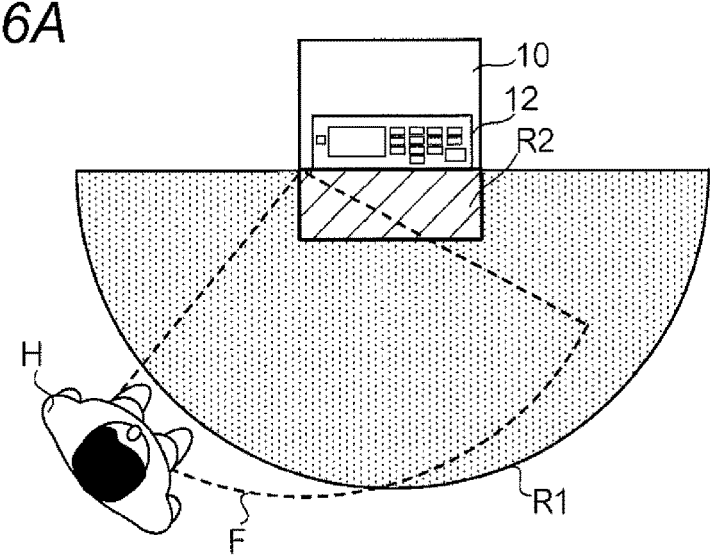
FIGS. 6A to 6C are diagrams illustrating position changes of a person who exists around the image forming apparatus.
Figure 6B:
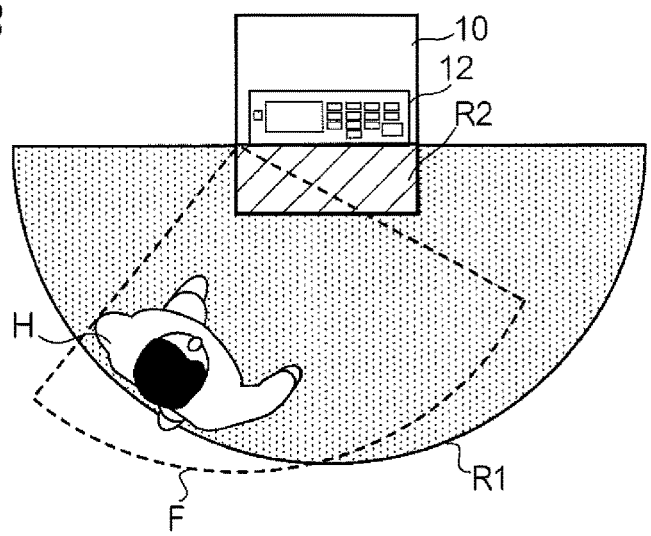
Figure 6C:
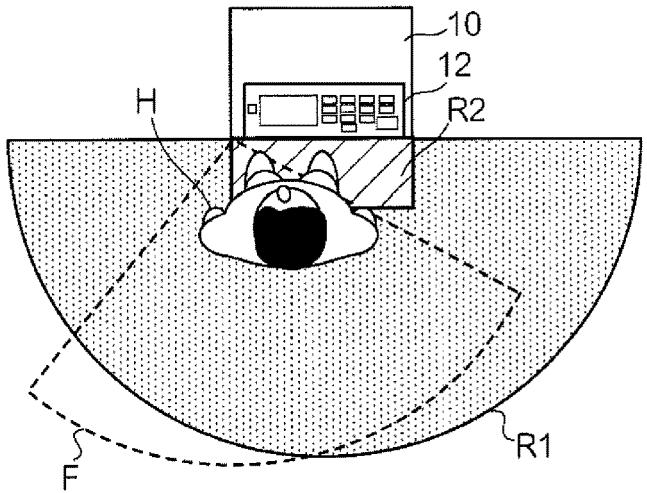

FIGS. 4 and 5 are flow charts illustrating a process related to pull print which is performed by the main controller 11 and the person monitoring unit 17 of the image forming apparatus 10. At the start point of the process which will be described below, the image forming apparatus 10 is set in the power-saving mode. FIGS. 6A to 6C are diagrams illustrating position changes of a person who exists around the image forming apparatus 10.

During the normal mode, the main controller 11 determines whether to switch over from the normal mode to the power-saving mode (step SA1). The main controller 11 may determine to switch over to the power-saving mode at step SA1, when the switch-over to the power-saving mode is ordered through an operation of the operating unit 121 by user, an operation of the operating unit 121 is not continuously received for a predetermined time, or the existence of a user within the approach detection range R2 is not detected.

The monitoring controller 172 determines whether face authentication is performed, during the normal mode (step SB1). When determining to be "NO" at step SB1, the monitoring controller 172 determines whether to switch over from the normal mode to the power-saving mode (step SB2). In the present exemplary embodiment, the condition for the switch over to the power-saving mode at step SB2 is based on the supposition that a notification of the switch over to the power-saving mode is received from the main controller 11.

When the main controller 11 determined to switch over to the power-saving mode (step SA1; YES), the main controller 11 stops a specific hardware circuit (step SA2). Specifically, the main controller 11 stops the operations of the user interface 12, the image forming unit 13, the image processing unit 14 and the communication unit 15, and instructs the power controller 16 to stop power supply to the hardware circuits.

The main controller 11 notifies the switch over to the power-saving mode to the monitoring controller 172 (step SA3). After the notification, the main controller 11 switches over to the power-saving mode (step SA4). Specifically, the main controller 11 stops the operation, and instructs the power controller 16 to stop power supply to the main controller 11.

When receiving the notification of the switch over to the power-saving mode from the main controller 11, the monitoring controller 172 determines to switch over to the power-saving mode (step SB2; YES), and switches over to the power-saving mode (step SB3). Specifically, the monitoring controller 172 stops the operations of the first image capturing unit 174 and the second image capturing unit 175, and instructs the power controller 16 to stop power supply to the hardware circuits. Then, the switch over of the image forming apparatus 10 to the power-saving mode is ended.

After switching over to the power-saving mode, the monitoring controller 172 starts an approach detection process (step SB4). As illustrated in FIG. 6A, the case in which a person H enters the detection range F may be taken as an instance. In this case, the monitoring controller 172 notifies a detection result of the pyroelectric sensor 171 to the monitoring processing unit 173, the detection result indicating the existence of the person within the detection range F. According to the notification, the monitoring processing unit 173 operates the first image capturing unit 174. Furthermore, the monitoring processing unit 173 (approach detector 1731) detects the existence of the person within the approach detection range R1 or R2, based on a captured image of the first image capturing unit 174, thereby detecting an approach of the person to the image forming apparatus 10.

The monitoring controller 172 determines whether an approach of the person is detected, based on the result of the approach detection process (step SB5). For instance, when the person H enters the approach detection range R1 as illustrated in FIG. 6B, the monitoring processing unit 173 detects that the person approaches the image forming apparatus 10.

When the approach of the person is detected by the monitoring processing unit 173 (step SB5; YES), the monitoring controller 172 transmits a return instruction signal to the main controller 11, the return instruction signal indicating a return to the normal mode from the power-saving mode (at step SB6). Furthermore, the monitoring processing unit 173 activates the authentication function (step SB7). At this time, the monitoring processing unit 173 (authentication unit 1732) activates the second image capturing unit 175. The monitoring controller 172 waits until the start-up completion signal is supplied from the main controller 11 (step SB8). The start-up completion signal is a signal indicating that the start-up of the main controller 11 is completed.

The main controller 11 receives the return instruction signal transmitted from the monitoring controller 172 (step SA5). Moreover, the main controller 11 activates the hardware circuits stopped at step SA2, and reinitializes the activated hardware circuits (step SA6). Specifically, the main controller 11 performs reinitialization by activating the user interface 12, the image forming unit 13, the image processing unit 14 and the communication unit 15. Then, when the start-up is completed, the main controller 11 transmits the start-up completion signal to the monitoring controller 172 (step SA7). The completion of the start-up indicates that the main controller 11 can receive a signal indicating a result of face authentication from the monitoring controller 172. Furthermore, the completion of the start-up may indicate that the start-up of the operating system executed by the main controller 11 is completed.

When it is determined that the start-up completion signal is received (step SB8; YES), the monitoring controller 172 controls the monitoring processing unit 173 to perform face authentication (step SB9). The face authentication is a process for specifying to which user the face of the person (person H in FIG. 6C) corresponds, the person existing within the approach detection range R2 and recognized through the captured image of the first image capturing unit 174. The monitoring controller 172 transmits the user ID of the user specified by the face authentication as the result of the authentication to the main controller 11 (at step SB10).

After transmitting the start-up completion signal at step SA7, the main controller 11 determines whether the user ID indicating the result of the face authentication is received (step SA8). When it is determined that the user ID is not received (step SA8; NO), the main controller 11 determines whether the timing of switch-over to the power-saving mode comes (at step SA10). At step SA10, the main controller 11 determines that the switch-over timing to the power-saving mode comes, when an operation of the operating unit 121 is not continuously received for a predetermined time. When determining to be "NO" at step SA10, the main controller 11 waits until a user ID is received. When determining to be "YES" at step SA10, the main controller 11 returns to step SA2, and executes the process for switching over to the power-saving mode.

When it is determined that the user ID is received at step SA8 (step SA8; YES), the main controller 11 determines whether a registered user is authenticated (step SA9). The registered user indicates a user who is registered in advance, and has an authority to use pull print. When it is determined that the user is not a registered user (step SA9; NO), the main controller 11 proceeds to step SA10, and when it is determined that the user is a registered user (step SA9; YES), the main controller 11 proceeds to step SA11 in FIG. 5.

The main controller 11 accesses an access destination corresponding to the registered user through the communication unit 15, in order to acquire process instruction data indicating an instruction of pull print (step SA11). The process instruction data may include at least image data of a processing target, and further include information on the corresponding process (color or page number). The main controller 11 designates a user ID to access the storage device 20. The access designation may be associated with a user ID and previously registered in the image forming apparatus 10 or the storage device 20.

The main controller 11 determines whether the process instruction data corresponding to the user ID are stored in the storage device 20 (step SA12). When one or more pieces of process instruction data are stored, the main controller 11 determines that the process instruction data corresponding to the user ID are stored (step SA12; YES). Then, the main controller 11 requests acquisition of the process instruction data from the storage device 20 through the communication unit 15 (step SA13).

When determining to be "NO" at step SA12, the main controller 11 returns to the process of step SA8 in FIG. 4.

The main controller 11 controls the display 122 to display an operation screen for receiving an operation of the user, based on the acquired process instruction data (step SA14). In this case, the main controller 11 controls the display 122 to display an operation screen including a list of processes indicated by the process instruction data. The operation screen is a screen for receiving an operation that instructs execution of all or a selected part of processes indicated by the process instruction data. The main controller 11 receives an operation of the user through the operating unit 121, using the operation screen (step SA15). When the execution of a part of the processes indicated by the process instruction data is instructed, the user performs an operation of selecting the process instruction data.

The main controller 11 determines whether to collectively or selectively execute the processes indicated by the process instruction data, according to the received operation (at step SA16). The collective execution indicates that the processes using the acquired image data are collectively executed, and the selective execution indicates that designated processes are executed.

When determining to collectively execute the processes (step SA16; collective execution), the main controller 11 controls the image forming unit 13 to form an image corresponding to image data, based on all of the acquired process instruction data (step SA17). When determining to selectively execute the processes (step SA16; selective execution), the main controller 11 controls the image forming unit 13 to form an image corresponding to image data, based on process instruction data selected by the user among the acquired process instruction data (step SA18).

The main controller 11 determines whether another operation is received while the operation screen is displayed (step SA19). When another operation is received (step SA19; YES), the main controller 11 returns to the process of step SA16. When no operation is received (step SA19; NO), the main controller 11 determines whether to log off (step SA20). For instance, when an operation indicating log-off is received, the main controller 11 determines to log off (step SA20; YES).

Subsequently, the main controller 11 transmits a log-off notification signal to the monitoring controller 172, the log-off notification signal notifying log-off (step SA21). Then, the main controller 11 logs off to return to the process of step SA10. When the log-off notification signal is received at step SB11, the monitoring controller 172 logs off to return to the process of step SB1.

As described above, the image forming apparatus 10 stops the communication line 50 during the power-saving mode. Therefore, the power consumption of the image forming apparatus 10 is reduced in comparison to when the image forming apparatus 10 communicates though the communication line 50. Moreover, the image forming apparatus 10 starts user authentication under the condition that an approach of a person is detected. When the authentication is successful, the image forming apparatus 10 starts a process for acquiring process instruction data for pull print from the storage device 20. Therefore, the image forming apparatus 10 can start a process using the process instruction data more quickly than when the process for acquiring process instruction data is started according to a user's instruction.

<B: Process Related to Communication Address Management>

Next, a process example 1 and a process example 2 will be described as the process related to communication address management which is performed in the image forming apparatus 10. The process related to communication address management is performed in parallel to the process related to pull print, which has been described with reference to FIGS. 4 and 5.

(B-1: Process Example 1)

Figure 7:
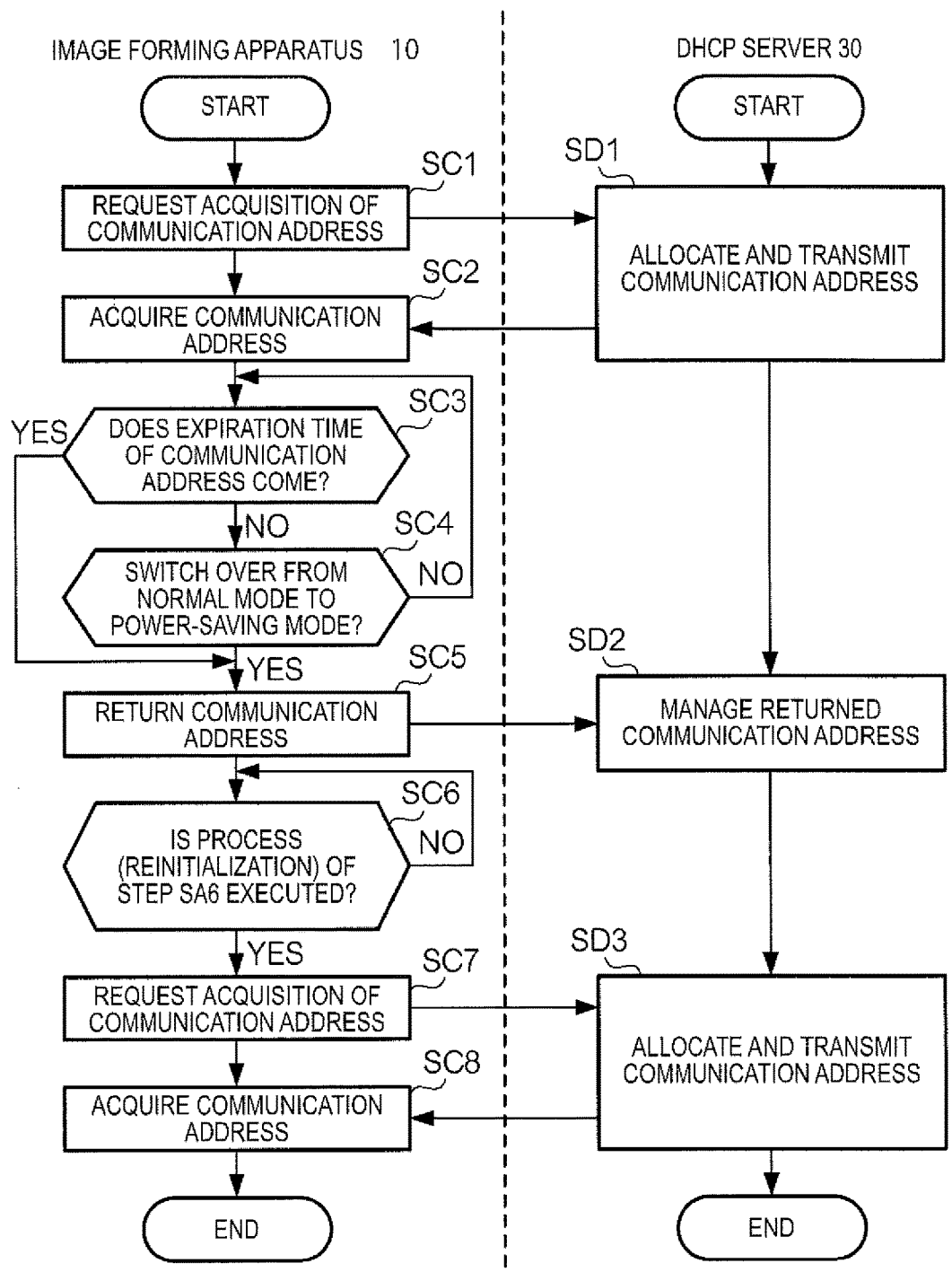
FIG. 7 is a flowchart illustrating a process (process example 1) related to communication address management executed by the image forming apparatus.

FIG. 7 is a flowchart illustrating the process example 1 of the process related to communication address management.

When a communication address is not yet allocated, for instance, at a point of time that the image forming apparatus 10 is initially connected to the communication line 50, the main controller 11 requests acquisition of an IP address from the DHCP server 30 through the communication unit 15 (step SC1). At this time, the image forming apparatus 10 is set in the normal mode.

When receiving the acquisition request for the communication address from the image forming apparatus 10, the DHCP server 30 allocates a communication address to the image forming apparatus 10, and transmits the communication address to the image forming apparatus 10 (step SD1). The DHCP server 30 sets a expiration time in the communication address, and manages the allocated communication address with the expiration time.

The main controller 11 of the image forming apparatus 10 acquires the allocated communication address from the communication line 50 through the communication unit 15 (step SC2). The main controller 11 stores the communication address, and performs communication through the communication line 50 using the communication address. The main controller 11 manages the allocated communication address with the expiration time. When the communication address is acquired, the main controller 11 starts timing through a timer, in order to determine whether the expiration time comes.

The main controller 11 determines whether the expiration time of the allocated communication address comes (step SC3). When determining to be "NO" at step SC3, the main controller 11 determines whether to switch over from the normal mode to the power-saving mode (step SC4). When determining to be "NO" at step SC4, the controller 11 returns to step SC3, and continuously uses the currently allocated communication address.

When determining to be "YES" at step SC4 or when determining to switch over from the normal mode to the power-saving mode even though the expiration time of the communication address does not come, the main controller 11 returns the communication address to the DHCP server 30 through the communication unit 15, before switching over to the power-saving mode (step SC5). That is, the main controller 11 performs a process for removing the allocation of the communication address. When the communication address is returned from the image forming apparatus 10, the DHCP server 30 manages the returned communication address at step SD1. The DHCP server 30 may allocate the returned communication address to another device.

After returning the communication address at step SC5, the main controller 11 determines whether the process of step SA6 is performed or whether the hardware circuits are initialized when the power-saving mode is switched to the normal mode (step SC6). Since the main controller 11 is stopped when the image forming apparatus 10 is in the power-saving mode, the process of step SC6 is not performed. That is, when the hardware circuits are initialized after the power-saving mode is switched to the normal mode, the main controller 11 determines to be "YES" at step SC6. Furthermore, the main controller 11 requests acquisition of an IP address from the DHCP server 30 through the communication unit 15 (step SC7).

When the acquisition request for the communication address is received from the image forming apparatus 10, the DHCP server 30 allocates a unique communication address to the image forming apparatus 10, and transmits the communication address to the image forming apparatus 10 (step SD3). The DHCP server 30 sets a expiration time in the communication address, and manages the allocated communication address with the expiration time. The main controller 11 of the image forming apparatus 10 acquires the allocated communication address from the communication line 50 through the communication unit 15 (step SC8). Furthermore, the main controller 11 manages the communication address with the expiration time in the same manner as the case in which the main controller 11 acquires the communication address at step SC2.

When the determination result at step SC3 is "YES", that is, when the expiration time comes in the normal mode, the main controller 11 returns the communication address at step SC7, passes step SC6, and performs a process for acquiring a newly allocated communication address (steps SC7 and SC8).

As described above, when the image forming apparatus 10 switches over to the power-saving mode, the main controller 11 returns the communication address to the DHCP server 30. During the power-saving mode, the communication unit 15 of the image forming apparatus 10 does not need a communication address because the communication unit 15 of the image forming apparatus 10 is stopped. Thus, although the return is performed, the return has no bad influence on the operation of the image forming apparatus 10, and the possibility that communication addresses used for devices connected to the communication line 50 will be scarce is low in comparison to when the return is not performed.

Figure 8:
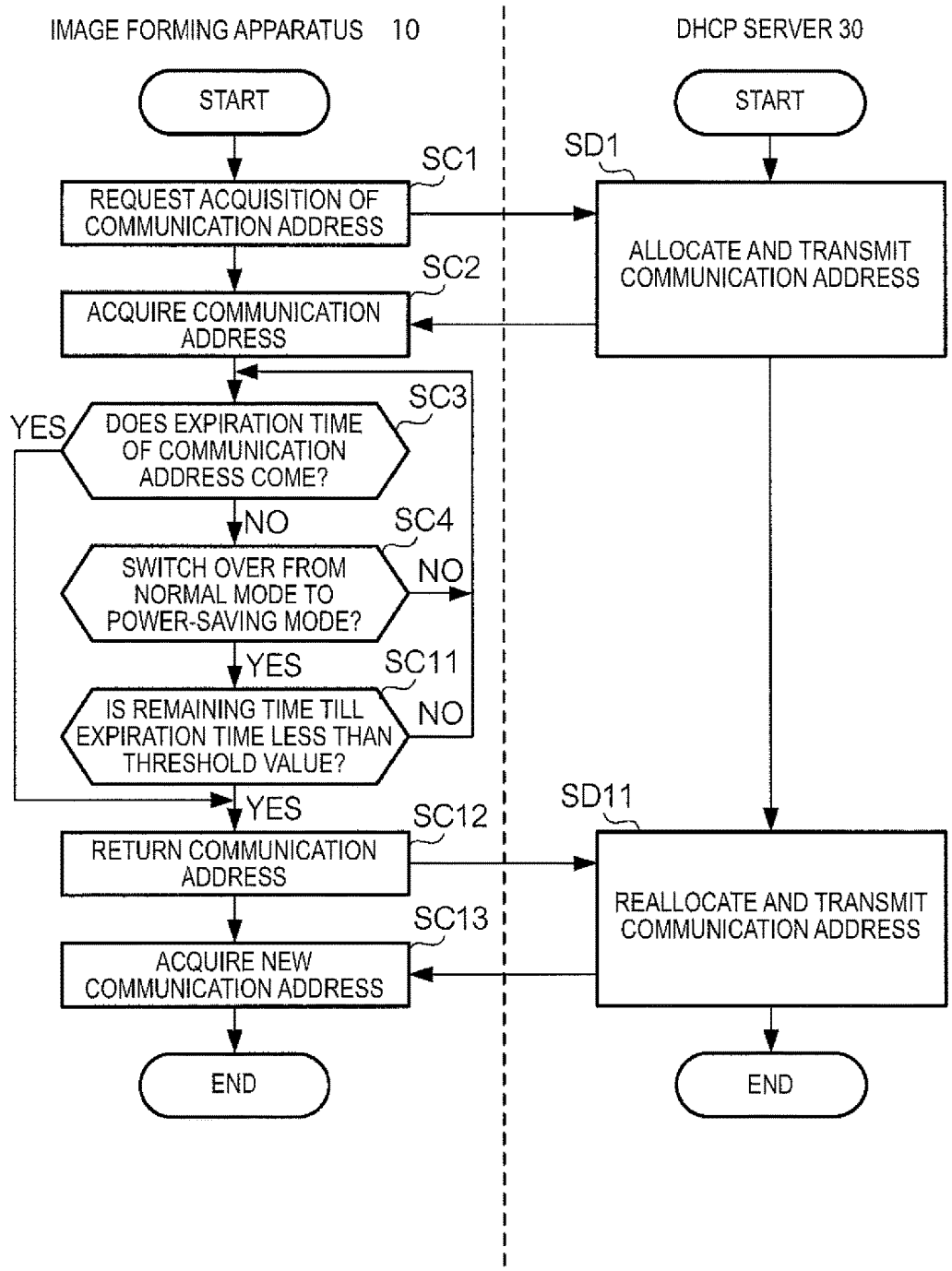
FIG. 8 is a flowchart illustrating a process (process example 2) related to communication address management executed by the image forming apparatus.

FIG. 8 is a flowchart illustrating the process example 2 of the process related to the communication address management, which is performed in the image forming apparatus 10. The processes of steps SC1, SD1 and SC2 are performed in the same manner as the above-described process example 1.

The main controller 11 determines whether the expiration time of the communication address acquired at step SC2 and allocated to the image forming apparatus 10 comes (step SC3). When determining to be "NO" at step SC3, the main controller 11 determines whether to switch over from the normal mode to the power-saving mode (step SC4). When determining to be "NO" at step SC4, the controller 11 returns to step SC3, and continuously uses the currently allocated communication address.

When the determination result at step SC4 is "YES", that is, when determining to switch over from the normal mode to the power-saving mode even though the expiration time of the communication address does not come, the main controller 11 determines whether a remaining time till the expiration time is less than a threshold value (step SC11). The threshold value is a predetermined time indicating that the remaining time till the expiration time is not much time. When the determination result at step SC11 is "NO", that is, when the remaining time till the expiration time is equal to or more than the threshold value, the main controller 11 returns to step SC3. That is, the main controller 11 switches over to the power-saving mode, in a state where the current communication address is stored.

On the other hand, when it is determined that the remaining time till the expiration time is less than the threshold value at step SC11 (step SC11; YES), the main controller 11 returns the communication address to the DHCP server 30 through the communication unit 15, before switching over to the power-saving mode (step SC12). When the communication address is returned from the image forming apparatus 10, the DHCP server 30 allocates a new communication address to the image forming apparatus 10, and transmits the communication address to the image forming apparatus 10 (step SD11). In this case, the DHCP server 30 also sets a expiration time in the communication address, and manages the allocated communication address with the expiration time.

The main controller 11 of the image forming apparatus 10 acquires the allocated communication address from the communication line 50 through the communication unit 15 (step SC13). Furthermore, the main controller 11 manages the communication address with the expiration time in the same manner as the case in which the main controller 11 acquires the communication address at step SC2.

When the determination result at step SC3 is "YES", that is, when the expiration time comes in the normal mode, the main controller 11 proceeds to step SC12 to return the communication address, and acquires a newly allocated communication address.

For instance, when the image forming apparatus 10 switches over from the normal mode to the power-saving mode even though the remaining time till the expiration time of the communication address is short, the image forming apparatus 10 may return to the normal mode to acquire a new communication address, immediately after switching over to the power-saving mode. On the other hand, when the remaining time till the expiration time of the communication address is short, the image forming apparatus 10 acquires a new communication address and then switches over from the normal mode to the power-saving mode, even before the expiration time. Thus, the image forming apparatus 10 may not return to the normal mode to acquire a new communication address, immediately after switching over to the power-saving mode. Therefore, compared to when a new communication address is acquired whenever the expiration time comes, the image forming apparatus 10 may reduce power consumption required for returning to the mode for reducing the power consumption of the information processing apparatus to acquire a communication address.

The invention may be embodied in a different form from the above exemplary embodiment. The following modifications may be combined.

The hardware configuration and the functional configuration of the image forming apparatus 10, which have been described in the above exemplary embodiment, are just an example.

In the above exemplary embodiment, the main controller 11 operates/reinitializes the hardware circuits according to a return instruction signal from the person monitoring unit 17. However, the main controller 11 may operate/reinitialize the hardware circuits according to a signal indicating that face authentication is started.

The image forming apparatus 10 may detect an approach of a person within the approach detection range R1 through a method other than the method using a captured image of the first image capturing unit 174. For instance, the image forming apparatus 10 specifies the position of the person within the approach detection range R1 using plural distance sensors, and detects the approach of the person based on temporal change of the specified position. The image forming apparatus 10 may detect the existence of a person within the approach detection range R2, using a method other than the method using a captured image.

The user authentication is not limited to the face authentication, but may include authentication using various pieces of biometric information, such as fingerprint and iris (biometrics authentication). Furthermore, the user authentication may include authentication using a password. For instance, when the face authentication of a user is not performed, the image forming apparatus 10 may not include the second image capturing unit 175.

In the above exemplary embodiment, the image forming apparatus 10 switches over to the power-saving mode when no person exists within the approach detection range R2. However, the switched mode may be set to any other mode except the power-saving mode, as long as the mode has the amount of power consumption lower than the normal mode. For instance, the image forming apparatus 10 may reduce the amount of power consumption by stopping the display of the display 122, and may switch over to a mode in which the operations of the respective units of the image forming apparatus 10 are maintained. Furthermore, the image forming apparatus 10 may operate according to a mode having different the amount of power consumption from the normal mode and the power-saving mode, in addition to the normal mode and the power-saving mode.

The hardware configuration and the functional configuration of the image forming apparatus 10, which have been described in the above exemplary embodiment, are just an example.

In the above exemplary embodiment, the image forming apparatus 10 is a console-type apparatus, but may be a desktop-type apparatus.

The information processing apparatus according to the exemplary embodiment of the invention may be an information processing apparatus other than the image forming apparatus, for instance, an information processing apparatus of a scanner, copier or facsimile or an information processing apparatus of a PC or server device.

The respective functions realized by the image forming apparatus 10 according to the respective exemplary embodiments may be accomplished by one or more hardware circuits, one or more programs which are executed by an arithmetic device, or a combination thereof. When the functions of the image forming apparatus 10 are accomplished through a program, the program may be provided in a state where the program is stored in a computer readable recording medium such as a magnetic recording medium (magnetic tape or magnetic disk (HDD (Hard Disk Drive) or FD (Flexible Disk)), an optical recording medium (optical disk), a magneto-optical recording medium or a semiconductor memory, or distributed through a network. Furthermore, the invention may be understood as an information processing method which is executed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a supply controller configured to control supply of power according to a first mode and a second mode having lower power consumption than the first mode;
an approach detector configured to detect an approach of a person during the second mode; and
at least one processor programmed to
switch over from the second mode to the first mode in a case where the approach of the person is detected,
perform authentication of the person after switching over to the first mode,
perform communication through a communication line by the power supply in the first mode,
request acquisition of data corresponding to a result of the authentication of the person through the communication line after switching over to the first mode from the second mode, and acquire the data corresponding to the request,
execute a process based on the acquired data,
manage a communication address which is allocated by an external device, the communication address being unallocated when an expiration time comes,
request the external device to unallocate the communication address even before the expiration time comes in a case where the first mode is to be switched to the second mode, and
switch over to the second mode after requesting to unallocate the communication address, wherein
in a case where the first mode is switched to the second mode and a remaining time till the expiration time is less than a predetermined value, the at least one processor requests the external device to unallocate the communication address and acquires a communication address newly allocated by the external device, and
the at least one processor switches over to the second mode after the newly allocated communication address is acquired.

2. The information processing apparatus according to claim 1, further comprising
a display configured to display an image by the power supply in the first mode, the image with which an operation of the person is received, wherein
the at least one processor is further programmed to receive the operation of the person using the image and execute the process according to the operation of the person.

3. An information processing method comprising:
controlling supply of power according to a first mode and a second mode having lower power consumption than the first mode;
detecting an approach of a person during the second mode;
switching over from the second mode to the first mode, when the approach of the person is detected;
performing authentication of the person, after the switching over to the first mode;
performing communication through a communication line by the power supply after switching over to the first mode from the second mode;
requesting acquisition of data corresponding to a result of the authentication of the person through the communication line, and acquiring the data corresponding to the request;
executing a process based on the acquired data;
managing a communication address which is allocated by an external device, the communication address being unallocated when an expiration time comes,
requesting the external device to unallocate the communication address even before the expiration time comes in a case where the first mode is to be switched to the second mode,
switching over to the second mode after requesting to unallocate the communication address, and
in a case where the first mode is switched to the second mode and a remaining time till the expiration time is less than a predetermined value,
requesting the external device to unallocate the communication address and acquiring a communication address newly allocated by the external device, and
switching over to the second mode after the newly allocated communication address is acquired.

* * * * *